US008086453B2

(12) United States Patent
Detlef et al.

(10) Patent No.: US 8,086,453 B2
(45) Date of Patent: *Dec. 27, 2011

(54) AUTOMATIC DETECTION AND APPLICATION OF EDITING PATTERNS IN DRAFT DOCUMENTS

(75) Inventors: Koll Detlef, Pittsburgh, PA (US); Juergen Fritsch, Pittsburgh, PA (US); Michael Finke, Pittsburgh, PA (US)

(73) Assignee: Multimodal Technologies, LLC, Pittsburgh, PA (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/360,109

(22) Filed: Jan. 26, 2009

(65) Prior Publication Data

US 2009/0132911 A1   May 21, 2009

Related U.S. Application Data

(63) Continuation of application No. 11/269,094, filed on Nov. 8, 2005, now Pat. No. 7,640,158.

(51) Int. Cl.
 *G10L 15/26* (2006.01)
(52) U.S. Cl. .......................................... 704/235; 704/9
(58) Field of Classification Search .............. 704/9, 235, 704/270

See application file for complete search history.

(56) References Cited

U.S. PATENT DOCUMENTS

| | | | |
|---|---|---|---|
| 6,064,957 A | | 5/2000 | Brandow et al. |
| 6,434,524 B1 * | | 8/2002 | Weber .......................... 704/257 |
| 6,618,697 B1 * | | 9/2003 | Kantrowitz et al. ............ 703/22 |
| 7,640,158 B2 * | | 12/2009 | Detlef et al. ................... 704/235 |
| 2002/0156816 A1 * | | 10/2002 | Kantrowitz et al. .......... 707/530 |
| 2002/0165716 A1 * | | 11/2002 | Mangu et al. ................. 704/255 |
| 2006/0235687 A1 * | | 10/2006 | Carus et al. ................... 704/252 |

OTHER PUBLICATIONS

Brill, Eric, "Transformation-Based Error-Driven Learning and Natural Language Processing: A Case Study in Part-of-Speech Tagging", Computational Linguistics, vol. 21, No. 4, Jan. 1, 1995, pp. 543-565.
Elming, Jakob, "Transformation-based correction of rule-based Mt", Proceedings of the EAMT 11th Annual Conference, Jun. 20 2006, 8 pages.
Strzalkowski et al., "A Natural Language Correction Model for Continuous Speech Recognition", Proceedings of the Fifth Workshop on Very Large Copora, Aug. 1, 1997, pp. 168-177.

* cited by examiner

*Primary Examiner* — Angela A Armstrong
(74) *Attorney, Agent, or Firm* — Robert Plotkin, P.C.

(57) ABSTRACT

An error detection and correction system extracts editing patterns and derives correction rules from them by observing differences between draft documents and corresponding edited documents, and/or by observing editing operations performed on the draft documents to produce the edited documents. The system develops classifiers that partition the space of all possible contexts into equivalence classes and assigns one or more correction rules to each such class). Once the system has been trained, it may be used to detect and (optionally) correct errors in new draft documents. When presented with a draft document, the system identifies first content (e.g., text) in the draft document and identifies a context of the first content. The system identifies a correction rule based on the first content and the first context. The system may use a classifier to identify the correction rule. The system applies the correction rule to the first content to produce second content.

16 Claims, 13 Drawing Sheets

AUTOMATIC DETECTION AND APPLICATION OF EDITING PATTERNS IN DRAFT DOCUMENTS

CROSS REFERENCE TO RELATED APPLICATIONS

This application is a continuation of and commonly-owned U.S. patent application Ser. No. 11/269,094, filed on Nov. 8, 2005 now U.S. Pat. No. 7,640,158, entitled, "Automatic Detection and Application of Editing Patterns in Draft Documents."

This application is related to the following commonly-owned U.S. patent applications, hereby incorporated by reference:

U.S. patent application Ser. No. 10/923,517, filed on Aug. 20, 2004, entitled, "Automated Extraction of Semantic Content and Generation of a Structured Document from Speech"; and U.S. patent application Ser. No. 10/922,513, filed on Aug. 20, 2004, entitled, "Document Transcription System Training."

BACKGROUND

1. Field of the Invention

The present invention relates to editing documents and, more particularly, to detecting and correcting errors in draft documents produced using an automatic document transcription system or other means.

2. Related Art

It is desirable in many contexts to generate a structured textual document based on human speech. In the legal profession, for example, transcriptionists transcribe testimony given in court proceedings and in depositions to produce a written transcript of the testimony. Similarly, in the medical profession, transcripts are produced of diagnoses, prognoses, prescriptions, and other information dictated by doctors and other medical professionals. Transcripts in these and other fields typically need to be highly accurate (as measured in terms of the degree of correspondence between the semantic content (meaning) of the original speech and the semantic content of the resulting transcript) because of the reliance placed on the resulting transcripts and the harm that could result from an inaccuracy (such as providing an incorrect prescription drug to a patient). It may be difficult to produce an initial transcript that is highly accurate for a variety of reasons, such as variations in: (1) features of the speakers whose speech is transcribed (e.g., accent, volume, dialect, speed); (2) external conditions (e.g., background noise); (3) the transcriptionist or transcription system (e.g., imperfect hearing or audio capture capabilities, imperfect understanding of language); or (4) the recording/transmission medium (e.g., paper, analog audio tape, analog telephone network, compression algorithms applied in digital telephone networks, and noises/artifacts due to cell phone channels).

The first draft of a transcript, whether produced by a human transcriptionist or an automated speech recognition system, may therefore include a variety of errors. Typically it is necessary to proofread and edit such draft documents to correct the errors contained therein. Transcription errors that need correction may include, for example, any of the following: missing words or word sequences; excessive wording; misspelled, -typed, or -recognized words; missing or excessive punctuation; and incorrect document structure (such as incorrect, missing, or redundant sections, enumerations, paragraphs, or lists).

Furthermore, formatting requirements may make it necessary to edit even phrases that have been transcribed correctly so that such phrases comply with the formatting requirements. For example, abbreviations and acronyms may need to be fully spelled out. This is one example of a kind of "editing pattern" that may need to be applied even in the absence of a transcription error.

Such error correction is typically performed by human proofreaders and can be tedious, time-consuming, costly, and itself error-prone. Furthermore, many error patterns occur frequently across documents and the necessity to repeatedly correct them may create a significant level of discontent among proofreaders. What is needed, therefore, are improved techniques for correcting errors in draft documents.

SUMMARY

An error detection and correction system extracts editing patterns and derives correction rules from them by observing differences between draft documents and corresponding edited documents, and/or by observing editing operations performed on the draft documents to produce the edited documents. The system develops classifiers that partition the space of all possible contexts into equivalence classes and assigns one or more correction rules to each such class). Once the system has been trained, it may be used to detect and (optionally) correct errors in new draft documents. When presented with a draft document, the system identifies first content (e.g., text) in the draft document and identifies a context of the first content. The system identifies a correction rule based on the first content and the first context. The system may use a classifier to identify the correction rule. The system applies the correction rule to the first content to produce second content.

For example, in one aspect of the present invention, a computer-implemented method is provided that includes steps of: (A) identifying a plurality of editing patterns of the form T=(D,E,C), wherein each of the plurality of editing patterns relates particular content D in an original document corpus to corresponding content E in an edited document corpus in a context C shared by contents D and E; and (B) deriving at least one correction rule from the plurality of editing patterns.

In another aspect of the present invention, a computer-implemented method is provided for editing a first document. The method includes steps of: (A) identifying first content in the document; (B) identifying a first context of the first content; (C) identifying a correction rule based on the first content and the first context; and (D) applying the correction rule to the first content to produce second content.

In yet another aspect of the present invention, a computer-implemented method is provided for editing a document. The method includes steps of: (A) identifying first content in the document; (B) identifying a first context of the first content; (C) determining whether a classifier applicable to the first content exists in a predetermined set of classifiers; and (D) if the classifier exists, performing steps of: (D) (1) using the classifier to identify a correction rule applicable to the first content in the first context; and (D) (2) applying the identified correction rule to the first content to produce second content.

Other features and advantages of various aspects and embodiments of the present invention will become apparent from the following description and from the claims.

DETAILED DESCRIPTION

Embodiments of the present invention are directed to techniques for detecting and correcting errors in draft documents. An error detection and correction system is trained by enabling the system to: (1) detect differences between draft documents and corresponding edited versions of such documents; and/or (2) observe the editing operations that are performed on the draft documents to correct errors therein. Using either training method, the system extracts a set of editing patterns that relate particular document content (such as text) in a particular context in a draft document to the corresponding edited content in the corresponding edited document. The system may use such editing patterns to develop: (1) correction rules that map draft content to edited content, (2) classifiers that may be used to identify the correction rule to apply to subsequently-observed content based on the context of such content; and (3) a classification of editing patterns into a set of categories that indicate, for example, the source of or reason for the editing pattern (e.g. punctuation-related, capitalization-related, hyphenation-related, formatting operation, general word substitution/deletion/insertion).

Once the system has been trained, it may be used to detect and correct errors in new documents, such as literal or non-literal transcripts of speech produced by a human transcriptionist or an automated transcription system. When presented with a new draft document, the system identifies any content for which correction rules exist. For each such content, the system uses one or more classifiers to select a correction rule to apply to the content based on the context of the content. The system applies the selected correction rule to the content, thereby producing edited content. In this way the system attempts to correct errors in the draft document.

The system may allow the user to select a correction rule, such as by allowing the user to select an edited version of the content from a list of candidate edited contents produced by competing correction rules. The user may then specify the correction rule to apply by selecting one of the candidate edited contents from the list.

Figure 1A:
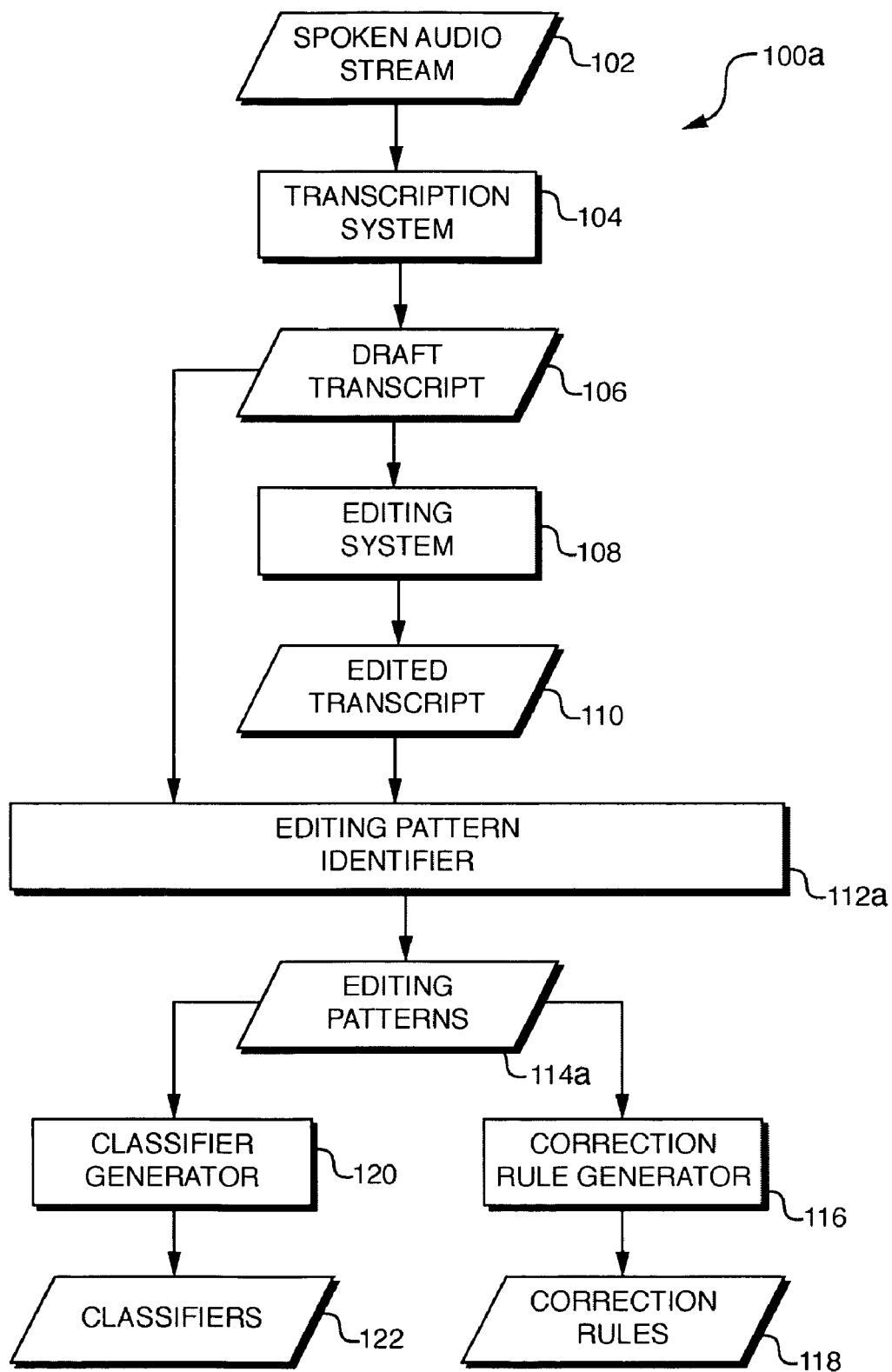
FIG. 1A is a dataflow diagram of a system for training a document error detection and correction system according to one embodiment of the present invention.
Figure 2A:
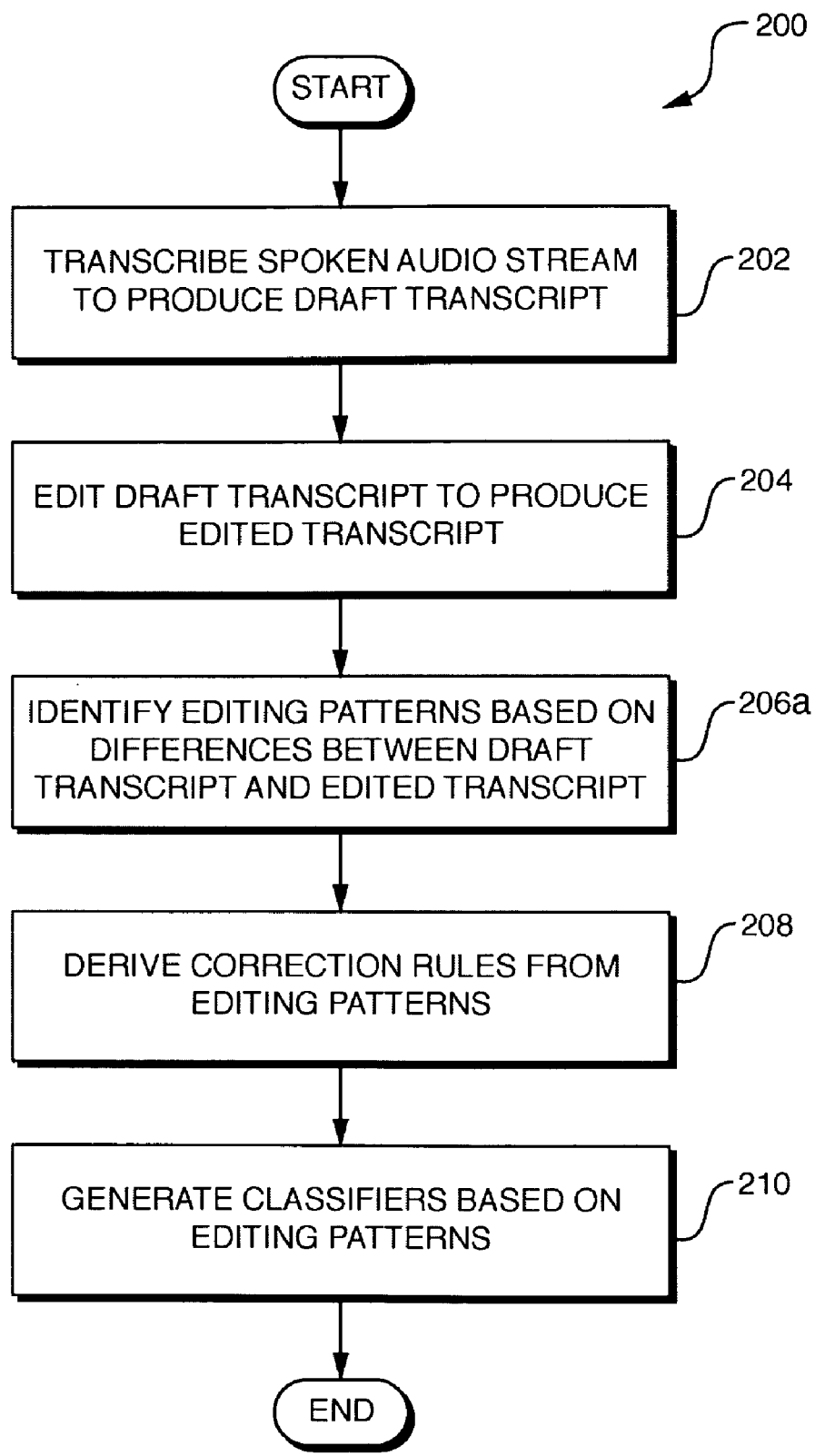
FIG. 2A is a flowchart of a method performed by the system of FIG. 1A according to one embodiment of the present invention.

Referring to FIG. 1A, a dataflow diagram is shown of a system 100a for training a document error detection and correction system according to one embodiment of the present invention. Referring to FIG. 2A, a flowchart is shown of a method 200 performed by the system 100a of FIG. 1A according to one embodiment of the present invention. A transcription system 104 transcribes a spoken audio stream 102 to produce a draft transcript 106 (step 202). The spoken audio stream 102 may, for example, be dictation by a doctor describing a patient visit. The spoken audio stream 102 may take any form. For example, it may be a live audio stream received directly or indirectly (such as over a telephone or IP connection), or an audio stream recorded on any medium and in any format.

The transcription system 104 may produce the draft transcript 106 using a human transcriptionist, an automated speech recognizer, or any combination thereof. The transcription system 104 may, for example, produce the draft transcript 106 using any of the techniques disclosed in the above-referenced patent application entitled "Automated Extraction of Semantic Content and Generation of a Structured Document from Speech." As described therein, the draft transcript 106 may be either a literal (verbatim) transcript or a non-literal transcript of the spoken audio stream 102. As further described therein, although the draft transcript 106 may be a plain text document, the draft transcript 106 may also, for example, be a structured document, such as an XML document which delineates document sections and other kinds of document structure.

An editing system 108 performs editing operations on the draft transcript 106 to produce an edited transcript 110 (step 204). The editing system 108 may, for example, include a human editor who edits the draft transcript 106 in an attempt to correct errors therein. The editing system 108 may also include, for example, conventional error correction means such as a conventional automatic spelling correction system. Editing operations that may be performed by the editing system 108 include, for example, adding content, deleting content, and moving content.

In the embodiment illustrated in FIGS. 1A and 2A, an editing pattern identifier 112a identifies editing patterns 114a based on differences between the draft transcript 106 and the edited transcript 110 (step 206a). The editing pattern identifier 112a may, for example, attempt to align the draft transcript 106 with the edited transcript 110. Document alignment may be performed from the structural level down to the individual word level, with the assumption that document structure is preserved during editing. The alignment attempt will reveal differences between the draft transcript 106 and the edited transcript 110. For example, text that appears at a particular location in the draft transcript 106 but not at the same location in the edited transcript 110 indicates that the editing system 108 deleted the text from the draft transcript 106 when producing the edited transcript 110.

As noted above, the draft transcript 106 and edited transcript 110 may be structured documents containing not only plain text but also document structures representing semantic and syntactic concepts, as those terms are defined in the above-referenced patent application entitled "Automated Extraction of Semantic Content and Generation of a Structured Document from Speech." As described in more detail therein, the term "concept" includes, for example, dates, times, numbers, codes, medications, medical history, diagnoses, prescriptions, phrases, enumerations and section cues. The term "content" is used herein to refer generally to any subset of a document, which may therefore include not only plain text but also representations of one or more concepts. The alignment performed by the editing pattern identifier 112a may, therefore, reveal editing not only of text, but also editing (e.g., addition, deletion, or movement) of document structures.

As used herein, the term "editing pattern" refers to a relationship between first content D in a first document (such as the draft transcript 106) and second content E in a second document (such as the edited transcript 110) in a particular shared context C. As used herein, the "context" of some content D is defined as any set of facts, circumstances, or features that relate to a document containing content D and that assist in interpreting content D. One example of the context of a particular unit of content D is the content (e.g., words) that immediately precedes and follows the content in the document. For example, in the case of the text "Patient John Smith," the words "Patient" and "Smith" would be an example of context for the word "John." This example of context may be generalized to include any amount of content preceding and following particular content.

Other examples of context for content D include: (1) the type of speech of content D (e.g., noun or verb) and/or of the words preceding and following content D; (2) the section (or other document structure) within which content D appears; (3) the domain or worktype (examples of which include letter, discharge summary, progress note, consultation note, discharge summary, or radiology report in the context of medical reports) of the document in which content D appears; and (4) the identity of the document's author or editor. Note that these are merely examples of the kinds of contexts that the editing pattern identifier 112a may be configured to utilize when generating editing patterns.

In the following description, an editing pattern T will be indicated using the notation T=(D,E,C), where D is content in a first document (e.g., the draft transcript 106), E is corresponding content in a second document (e.g., the edited transcript 110), and C is the shared context in which D and E appear in their respective documents. Note that context C does not necessarily uniquely determine the pair D and E in the document. Note further that either D or E (but not both) may be empty, thereby representing content insertion (when D is empty) or deletion (when E is empty). Such an editing pattern is referred to as a "positive pattern" if D differs from E. In step 206a, the editing pattern identifier 112a may identify one or more positive editing patterns by comparing the draft transcript 106 to the edited transcript 110 and produce a positive editing pattern for each content D in the draft transcript 106 and content E in the edited transcript 110 if and only if D differs from E and both D and E occur in the same context C. Each editing pattern T=(D,E,C) may occur one or more times in a collection of document pairs. An occurrence count N may therefore be associated with each editing pattern.

A correction rule generator 116 derives correction rules 118 from the editing patterns 114a (step 208). As used herein, the term "correction rule" refers to a rule R=(D,E), which indicates that content D is to be replaced (e.g., corrected) with content E. The correction rule (D,E) may, for example, be derived in step 208 from the editing pattern (D,E,C). As will be described in more detail below, the correction rules 118 may subsequently be used to correct errors in other documents.

A classifier generator 120 uses an induction algorithm to derive classifiers 122 for selecting the correction rule to apply to subsequently-observed content based on the context of such content (step 210). In general, a classifier partitions the space of all possible contexts for particular content D into equivalence classes based on the editing patterns observed in a training set, such that each equivalence class corresponds to a unique correction rule (D,E). Examples of techniques for generating the classifiers 122 will be described in more detail below with respect to FIG. 5.

Note that although the correction rules 118 and classifiers 122 are shown in FIGS. 1A and 2A as being generated in separate steps (208 and 210) by separate components (116 and 120), this is not a requirement of the present invention. As will be described in more detail below, the correction rules 118 and classifiers 122 are interrelated and may be generated in an integrated process by a combined rule/classifier generator.

Figure 1B:
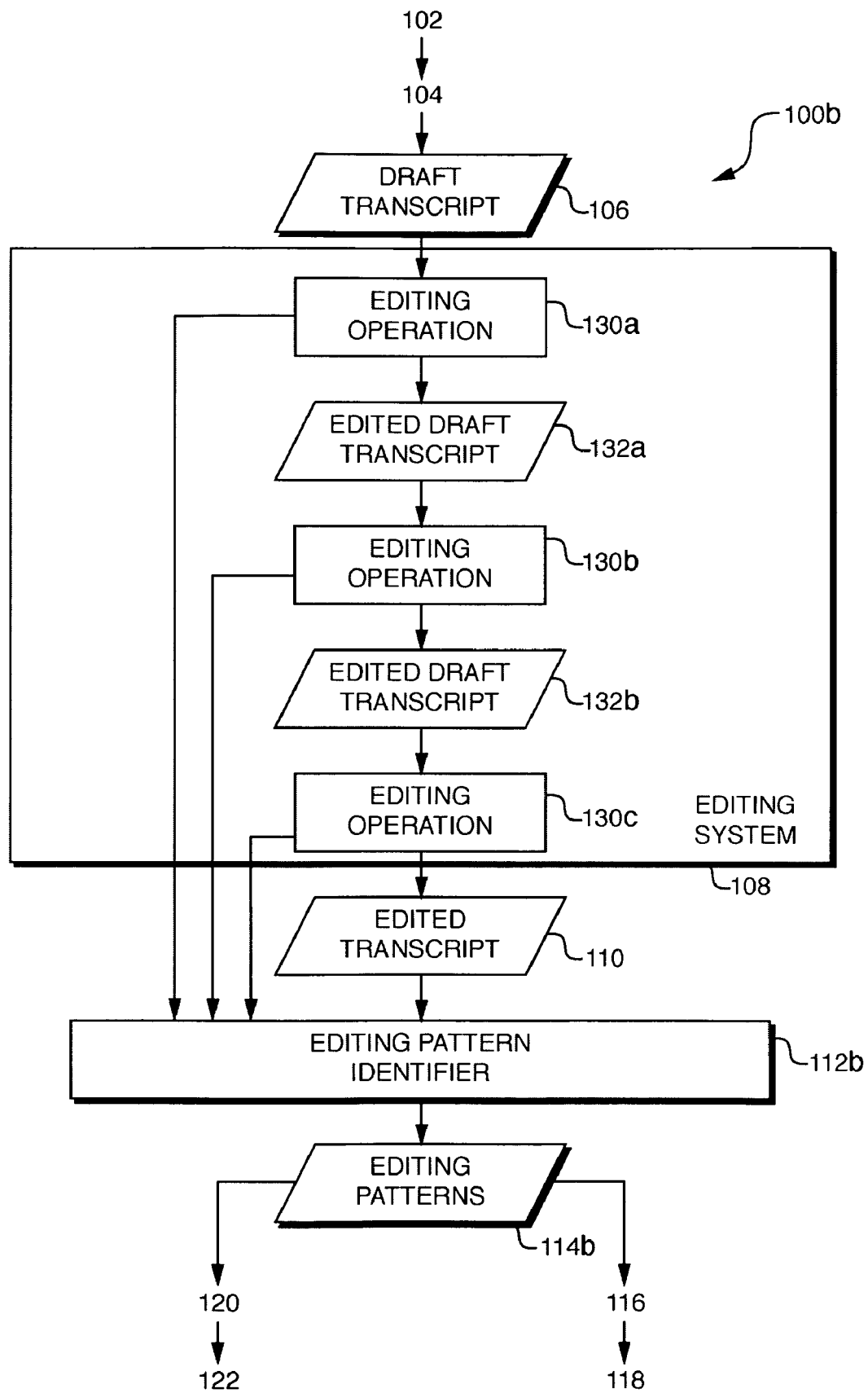
FIG. 1B is a dataflow diagram of another embodiment of the document error detection and correction system of FIG. 1A.
Figure 2B:
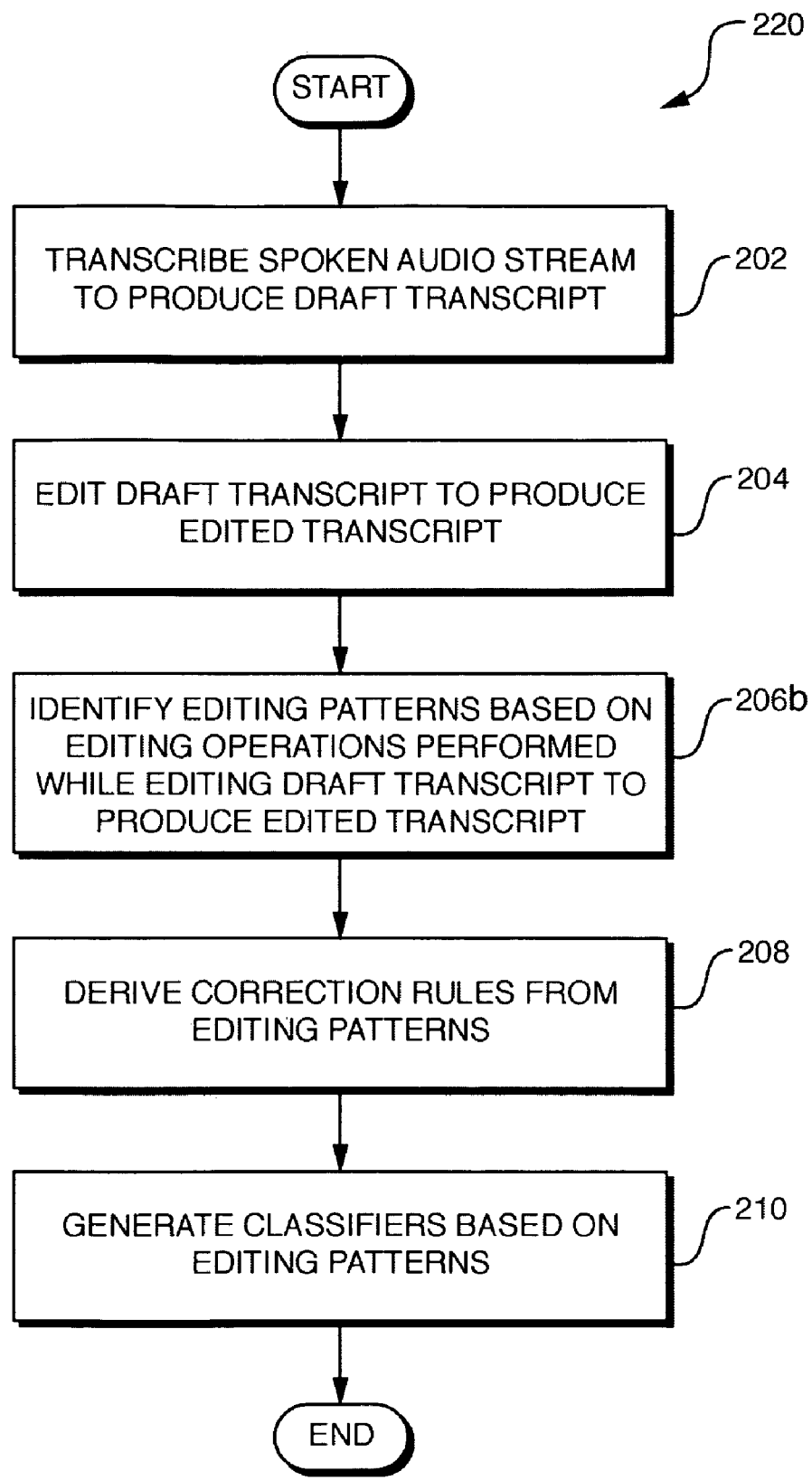
FIG. 2B is a flowchart of a method that is performed by the system of FIG. 1B in one embodiment of the present invention.

Referring to FIG. 1B, a dataflow diagram is shown of another embodiment 100b of the document error detection and correction system 100a. Referring to FIG. 2B, a flowchart is shown of a method 220 that is performed by the system 100b in one embodiment of the present invention. Like the system 100a shown in FIG. 1A, the system 100b shown in FIG. 1B includes transcription system 104 for transcribing the spoken audio stream 102 into the draft transcript 106 (steps 202-204). Recall that the editing pattern identifier 112a in FIG. 1A produced the editing patterns 114a based on observed differences between the draft transcript 106 and the edited transcript 110. In contrast, the editing pattern identifier 112b system in FIG. 1B generates editing patterns 114b by observing the performance of editing operations 130a-c performed on the draft transcript 106 to produce the edited transcript 110 (step 206b). The editing pattern identifier 112b may, for example, monitor the keypresses, mouseclicks, and other input received from a user while editing the draft transcript. The editing pattern identifier 112b may record information such as the kind of input (e.g., keypress or mouseclick), identifying features of the input (e.g., the identity of the key pressed or the coordinates and type of mouse click), and the context in which the input is received (e.g., the characters surrounding the location of the text cursor at the time the input is received). Editing operation 130a produces an intermediate edited draft transcript 132a, editing operation 130b produces an intermediate edited draft transcript 132b, and editing operation 130c produces the final edited transcript 110. Although only three editing operations 130a-c are shown in FIG. 1B, any number of editing operations may be performed and monitored.

The method 220 concludes by deriving the correction rules 118 from the editing patterns 114b and generating the classifiers 122 based on the editing patterns 114b in the manner described above with respect to FIGS. 1A and 2A. The methods shown in FIGS. 1A and 2A may be combined with those shown in FIGS. 1B and 2B to train the system using both observed differences between documents and observed editing operations.

Figure 3A:
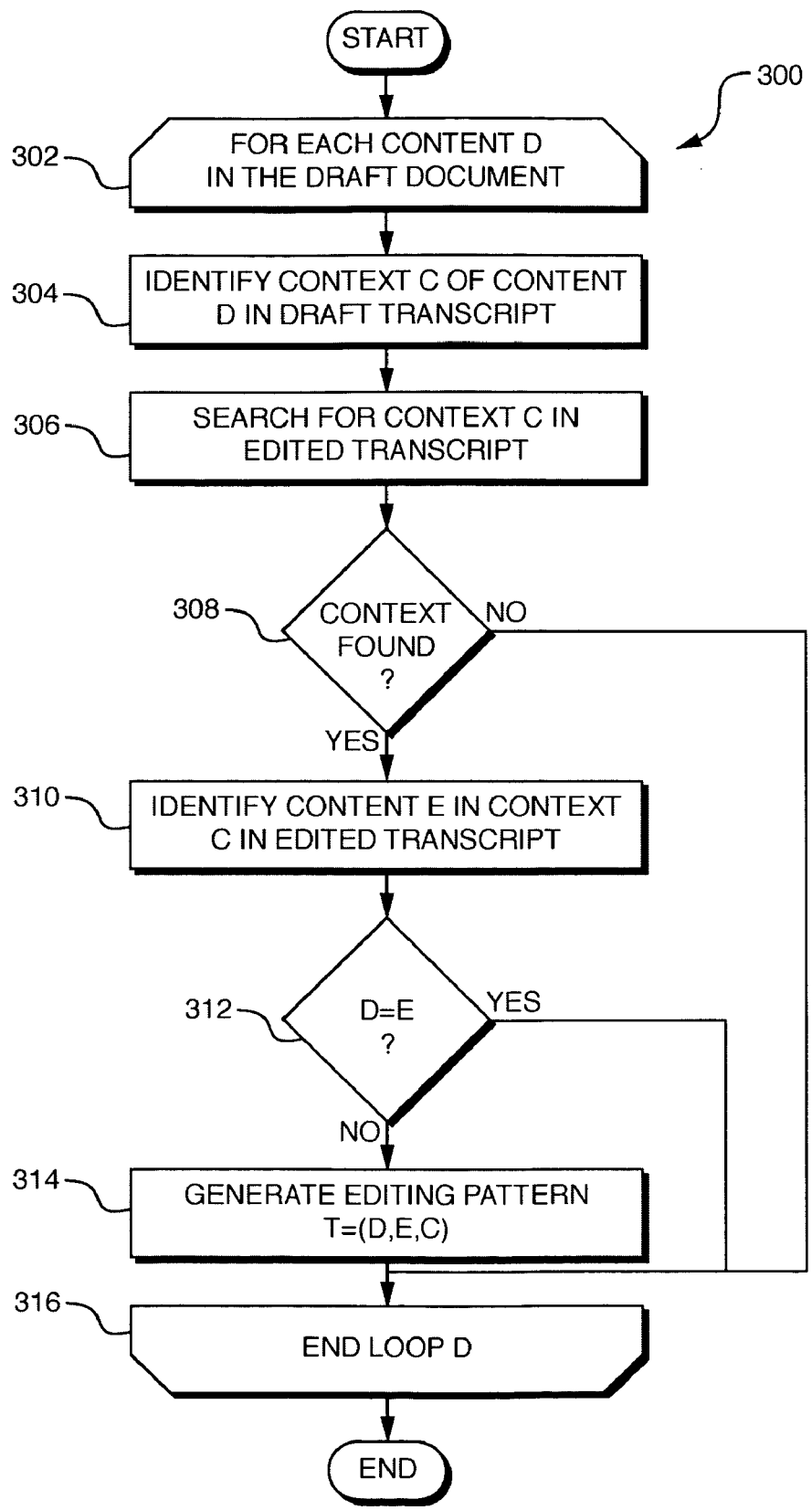
FIGS. 3A-3B are flowcharts of methods for generating editing patterns according to various embodiments of the present invention.

As mentioned above, the editing pattern identifiers 112a-b (referred to herein collectively as editing pattern identifier 112) may identify one or more editing patterns by comparing the draft transcript 106 to the edited transcript 110 and producing a positive editing pattern for each content D in the draft transcript 106 that occurs in the same context C as different content E in the edited transcript 110. Referring to FIG. 3A, a flowchart is shown of a method 300 that may be performed by the editing pattern identifier 112 to generate such positive editing patterns.

The method 300 enters a loop over each unit of content D in the draft transcript 106. If the draft transcript 106 is a flat text document, the units of content may, for example, be sequences of one or more consecutive words. If the draft transcript 106 is a structured document, the units of content may additionally include, for example, paragraphs, sections, dates, or other kinds of "concepts" as that term is defined in the above-referenced patent application entitled "Automated Extraction of Semantic Content and Generation of a Structured Document from Speech." If the draft transcript 106 is a hierarchical structured document, the method 300 may iterate over contents in the draft transcript 106 by navigating the hierarchy of the document, in which case the contents D may vary in type and scope.

The method 300 identifies context C of content D in the draft transcript 106 (step 304). The context C may be identified at any level of granularity and distance from content D. The method 300 attempts to identify context C in the edited transcript 110 (step 306). The method 300 may identify the context C using, for example, the document alignment described above with respect to FIG. 2A.

If the context C is identified in the edited transcript 110, then the method 300 identifies the content E in context C in the edited transcript 110 (step 310). Content E in the edited transcript 110 corresponds to content D in the draft (original) transcript 106 because both contents share the same context.

The method 300 determines whether content D and content E are equivalent to each other (step 312). The editing pattern identifier 112 may define content equivalence in any way. At the very least, contents D and E are equivalent if they are the same. The editing pattern identifier 112 may, however, define equivalence more broadly such that contents having differences which do not constitute an error are considered to be equivalent, and therefore do not necessarily trigger the generation of an editing pattern.

If contents D and E are equivalent to each other, then no editing pattern is generated. If contents D and E are not equivalent to each other, the method 300 generates an editing pattern T=(D,E,C) (step 314), indicating that content D was observed to be replaced with content E in context C. If the particular editing pattern T=(D,E,C) has been observed already in other training documents, the method 300 may merely increase the occurrence count N for the already existing editing pattern, thereby keeping track of how many times the editing pattern has been observed in a given training set. The method 300 repeats steps 304-314 for the remaining units of content D in the draft transcript 106 (step 316).

Note that because the method 300 shown in FIG. 3A loops over each unit of content in the draft transcript 106, the method 300 may observe different positive editing patterns for different instances of the same content. For example, the method 300 may observe not only that content D in the draft transcript 106 has been replaced with content E in context C the edited transcript 110 (i.e., editing pattern T=(D,E,C)), but also that content D has been replaced with content E' in context C (i.e., editing pattern T=(D,E',C)), where E' differs from E. Similarly, the method 300 may observe that content D has been replaced with content E in context C' (i.e., editing pattern T=(D,E,C')), where C' differs from C. Finally, the method 300 may observe that content D has been replaced with content E' in context C' (i.e., editing pattern T=(D,E', C')). All of these are examples of positive editing patterns that may be observed by the method 300.

Figure 3B:
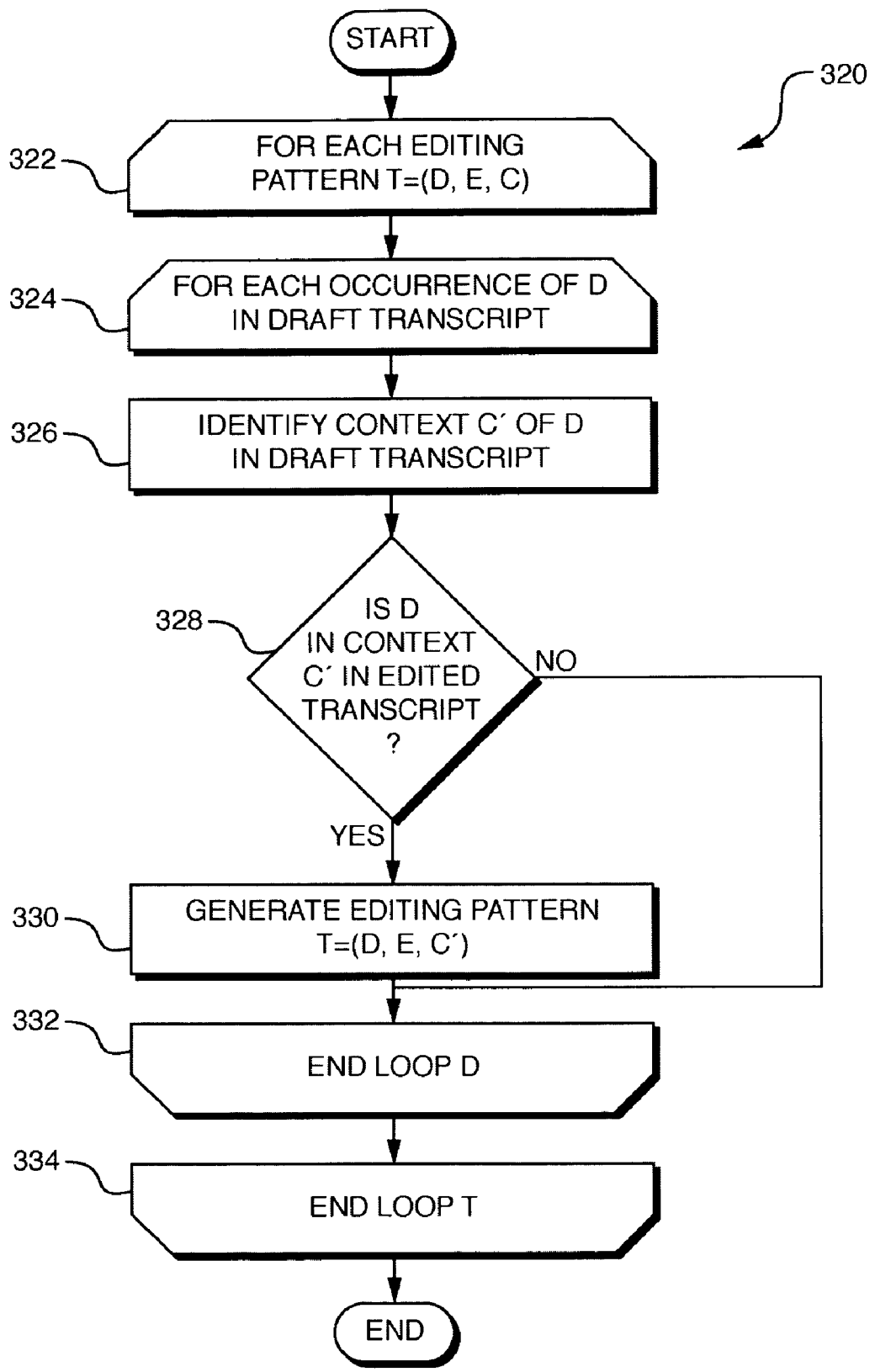

The editing pattern identifier 112a may also generate, for each positive editing pattern T=(D,E,C), one or more "negative" editing patterns of the form T=(D,D,C') in which the same (or equivalent) content D was not edited in a context C' that may or may not differ from the context C of the corresponding positive editing patterns. Referring to FIG. 3B, a flowchart is shown of a method 320 for generating such negative editing patterns. The method 320 enters a loop over each existing positive editing pattern T=(D,E,C) in the set of editing patterns 114a-b (referred to herein collectively as editing patterns 114) (step 322). The method 320 enters a sub-loop over each occurrence of the content D (or its equivalent) in the draft transcript 106. It then identifies the context C' of the content D in the draft transcript 106 (step 326) and determines whether the content D (or its equivalent) also occurs in the edited transcript 110 in the same context C'(step 328). For each such occurrence, the method 320 generates a negative editing pattern T=(D,D,C') (step 330).

The method 320 repeats steps 326-330 for each remaining occurrence of content D (or its equivalent), and repeats steps 324-332 for each remaining positive editing pattern (step 334).

It should be appreciated that any combination of the methods illustrated in FIGS. 3A-3B may be performed to generate any kind(s) of editing patterns that are desired. Furthermore, the present invention is not limited to generating the kinds of editing patterns disclosed herein.

Figure 4:
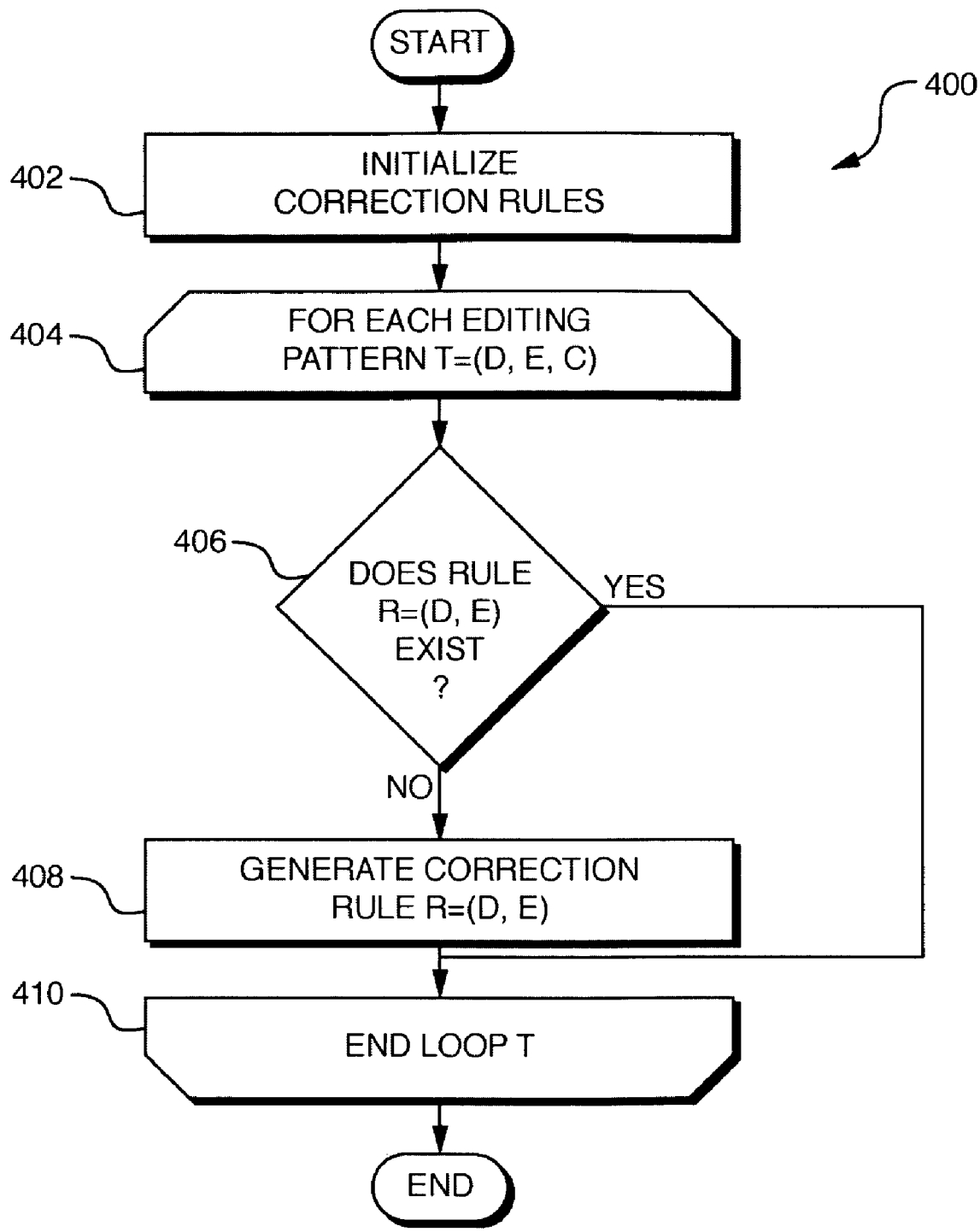
FIG. 4 is a flowchart of a method that is performed by the correction rule generator of FIGS. 1A-1B to generate correction rules according to one embodiment of the present invention.

As mentioned above in connection with FIGS. 1A and 2A, the correction rule generator 116 generates correction rules 118 based on the editing patterns 114. Referring to FIG. 4, a flowchart is shown of a method 400 that is performed by the correction rule generator 116 to generate the correction rules according to one embodiment of the present invention. The method 400 begins by initializing the correction rules 118, such as by creating an empty set of correction rules (step 402).

The method 400 enters a loop over each of the existing editing patterns 114, which have the form T=(D,E,C) (step 404). The method 400 determines whether the correction rules 118 already include a correction rule of the form R=(D, E) (step 406).

Note that the correction rules need not be defined in terms of a mapping between particular content D and some other particular content E. A correction rule may, for example, specify a procedure to apply to a class of contents D to produce a class of edited contents E. For example, a correction rule may specify that all decimal numbers be spelled out in words. Such a rule would, for example, replace "13" with "thirteen." Such a rule may be learned by observing repeated instances of editing patterns that are consistent with this rule.

Returning to FIG. 4, if the correction rules 118 do not include a rule that transforms content D into content E, the method 400 adds the rule R=(D,E) to the correction rules 118 (step 408). Otherwise, the method 400 does not add a new correction rule to the correction rules 118. The method repeats steps 406-408 for the remaining ones of the editing patterns 114 (step 410). Upon completion of the method 400, the correction rules 118 will include a correction rule for each observed transformation of content D in the draft transcript 106 into content E in the edited transcript 110 in the same context C.

Figure 5:
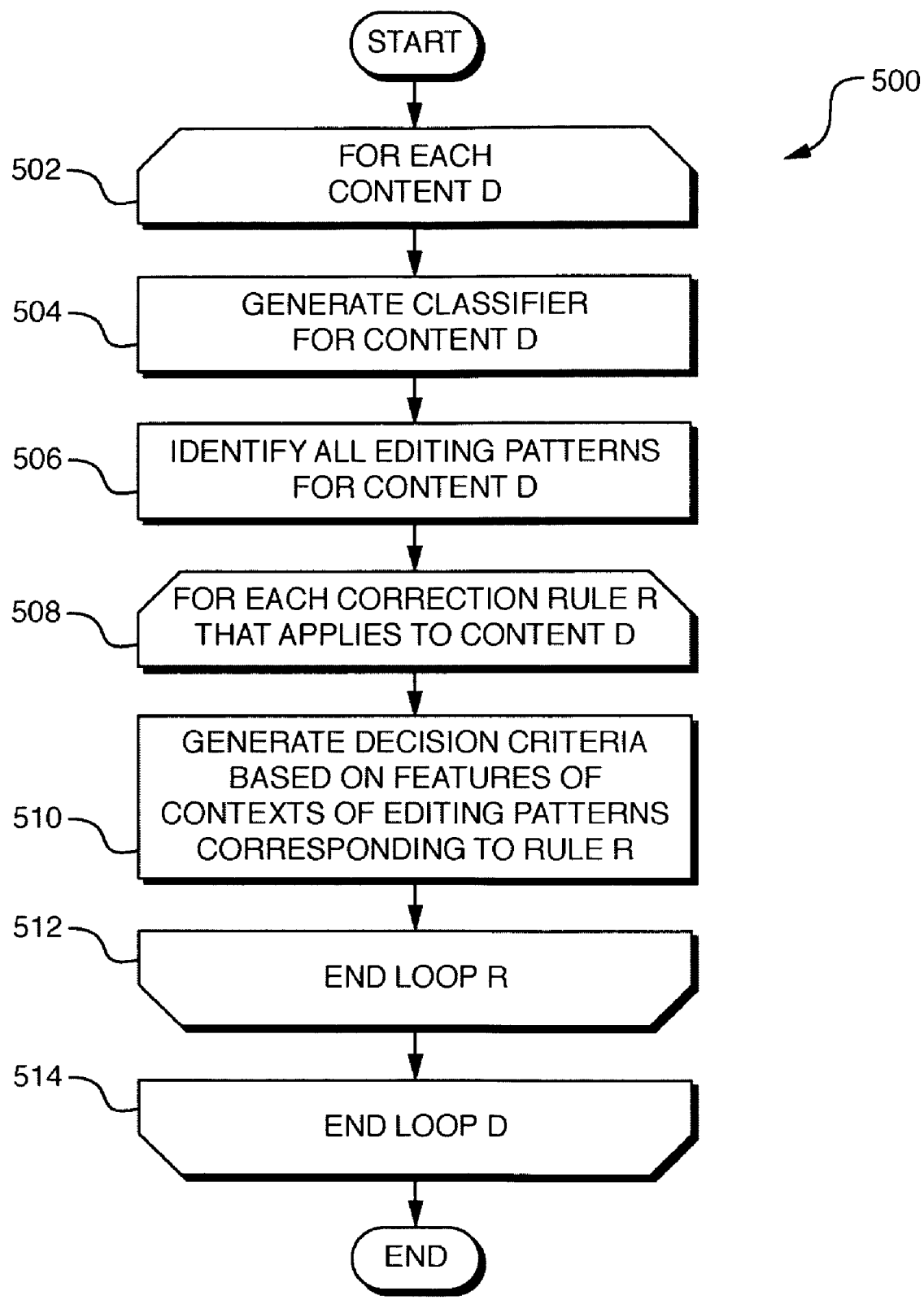
FIG. 5 is a flowchart of a method for generating classifiers according to one embodiment of the present invention.

As mentioned above in connection with FIGS. 1A and 2A, the classifier generator 120 generates classifiers 122 based on the editing patterns 114. Referring to FIG. 5, a flowchart is shown of a method 500 that is performed by the classifier generator 120 to generate the classifiers 122 according to one embodiment of the present invention. The method 500 enters a loop over each content D in the previously collected editing patterns (step 502). As described above, the content D may be any kind of content at any level of granularity. The method 500 generates a classifier for content D (step 504). Note, however, that the method 500 may generate classifiers for any number of contents D, including a single classifier for all of the contents D. Initially, the classifier does not specify any decision criteria for selecting the correction rule to apply to content D in any context.

Figure 9A:
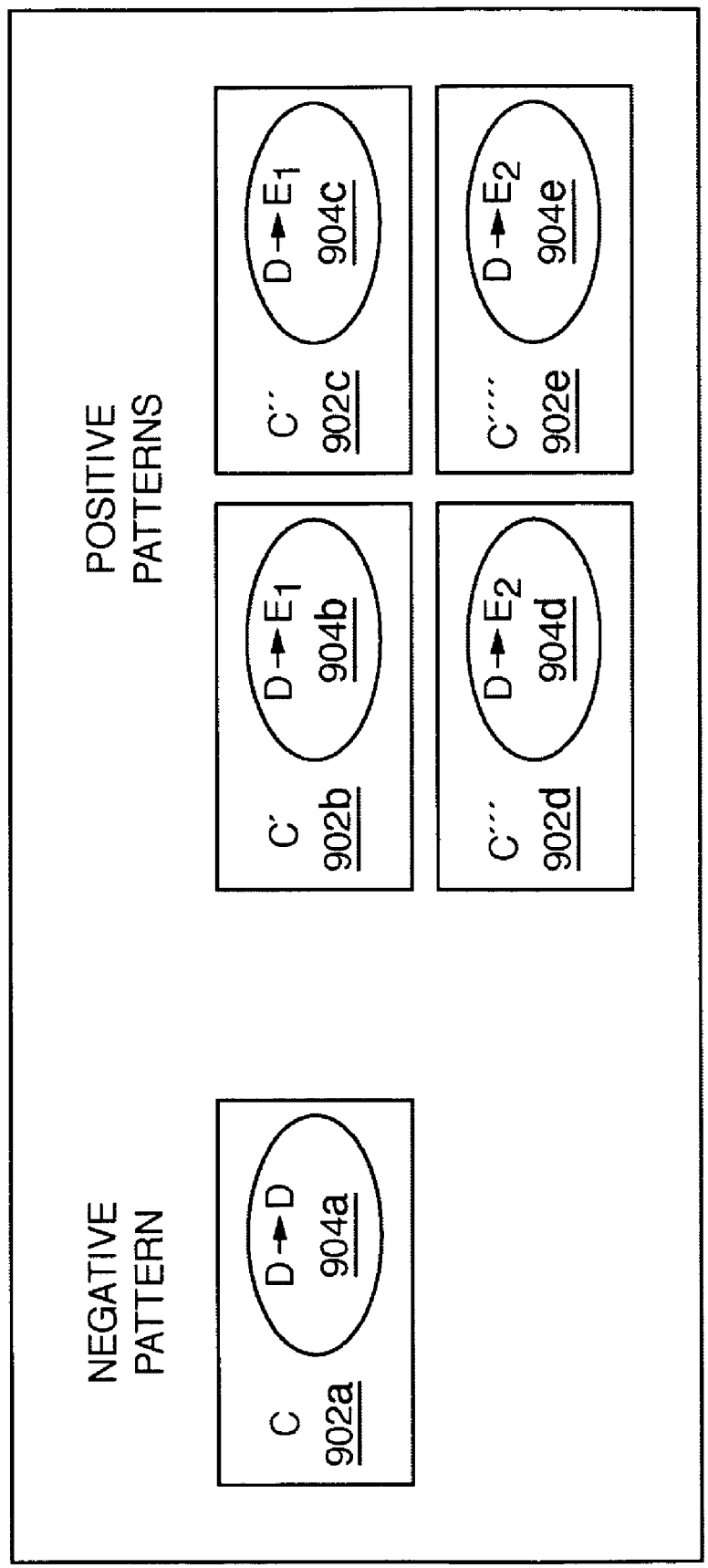
FIGS. 9A-9B are diagrams illustrating a space of possible contexts for a particular content according to one embodiment of the present invention.

To aid understanding the remainder of method 500, consider an example of the space 900 illustrated in FIG. 9A of all possible contexts for content D. For purposes of example, five observed editing patterns 902a-e for content D are shown in the space 900. Editing pattern 902a indicates that content D was observed to map to itself (i.e., to be unedited) in context C. Editing pattern 902b indicates that content D was observed to map to content $E_1$ in context C'. Editing pattern 902c indicates that content D was also observed to map to content $E_1$ in context C". Editing pattern 902d indicates that content D was observed to map to content $E_2$ in context C'". Finally, editing pattern 902e indicates that content D was also observed to map to content $E_2$ in context C"". The particular editing patterns in FIG. 9A are merely examples.

The method 500 identifies all of the existing editing patterns for content D (step 506). In the example shown in FIG. 9A, the method 500 would identify the editing patterns 902a-e. The method 500 enters a loop over each correction rule R that applies to content D (step 508). In the example illustrated in FIG. 9A, the editing patterns 902a-e correspond to three unique correction rules: (D,D) 906a, (D,$E_1$) 906b, and (D,$E_2$) 906c.

The method 500 generates decision criteria based on features of the contexts of the editing patterns that correspond to rule R (step 510). These decision criteria may be used by the classifier for content D to decide whether to apply the correction rule R to subsequently-observed instances of content D based on its context. The method 500 repeats step 510 for the remaining correction rules (step 512), and repeats steps 504-512 for the remaining content (step 514).

Figure 9B:
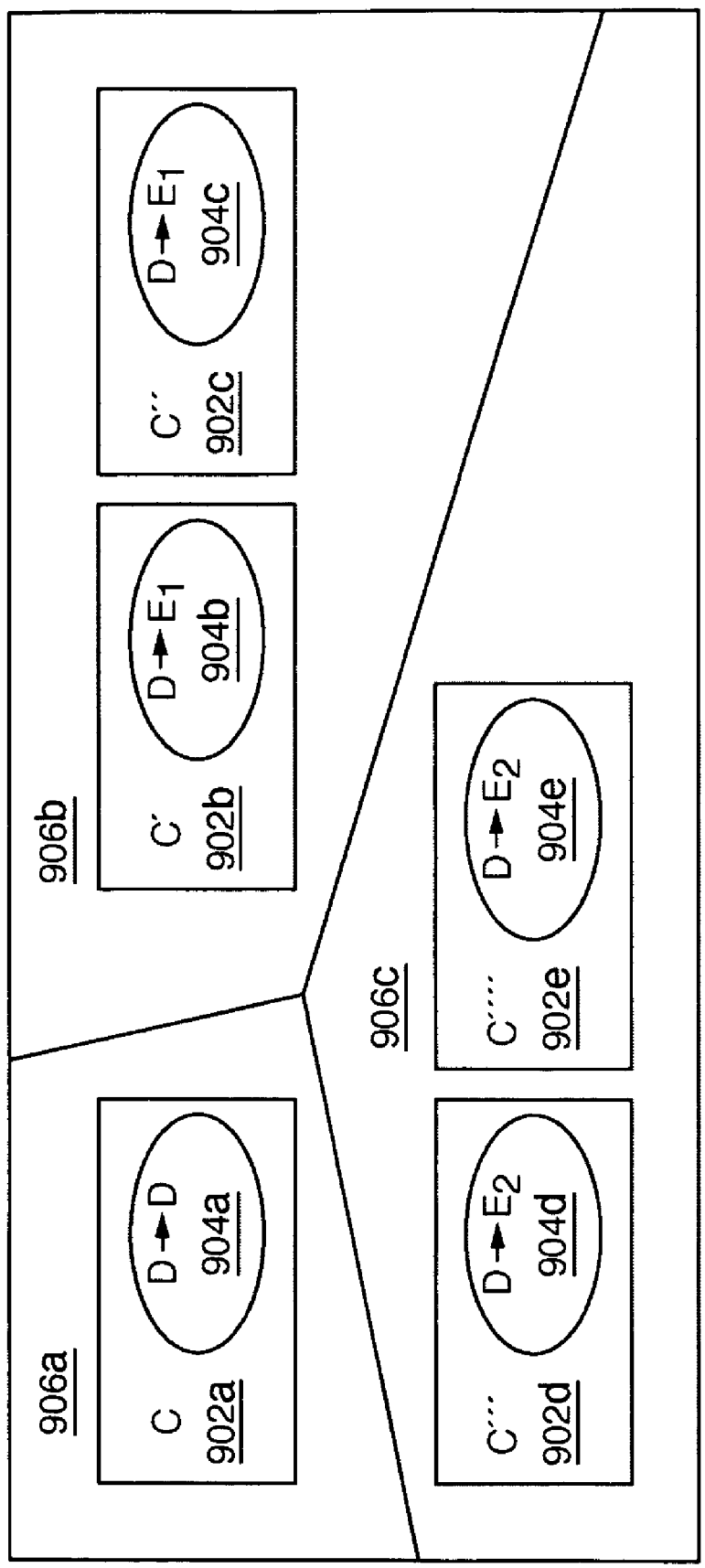
Figure 3B:
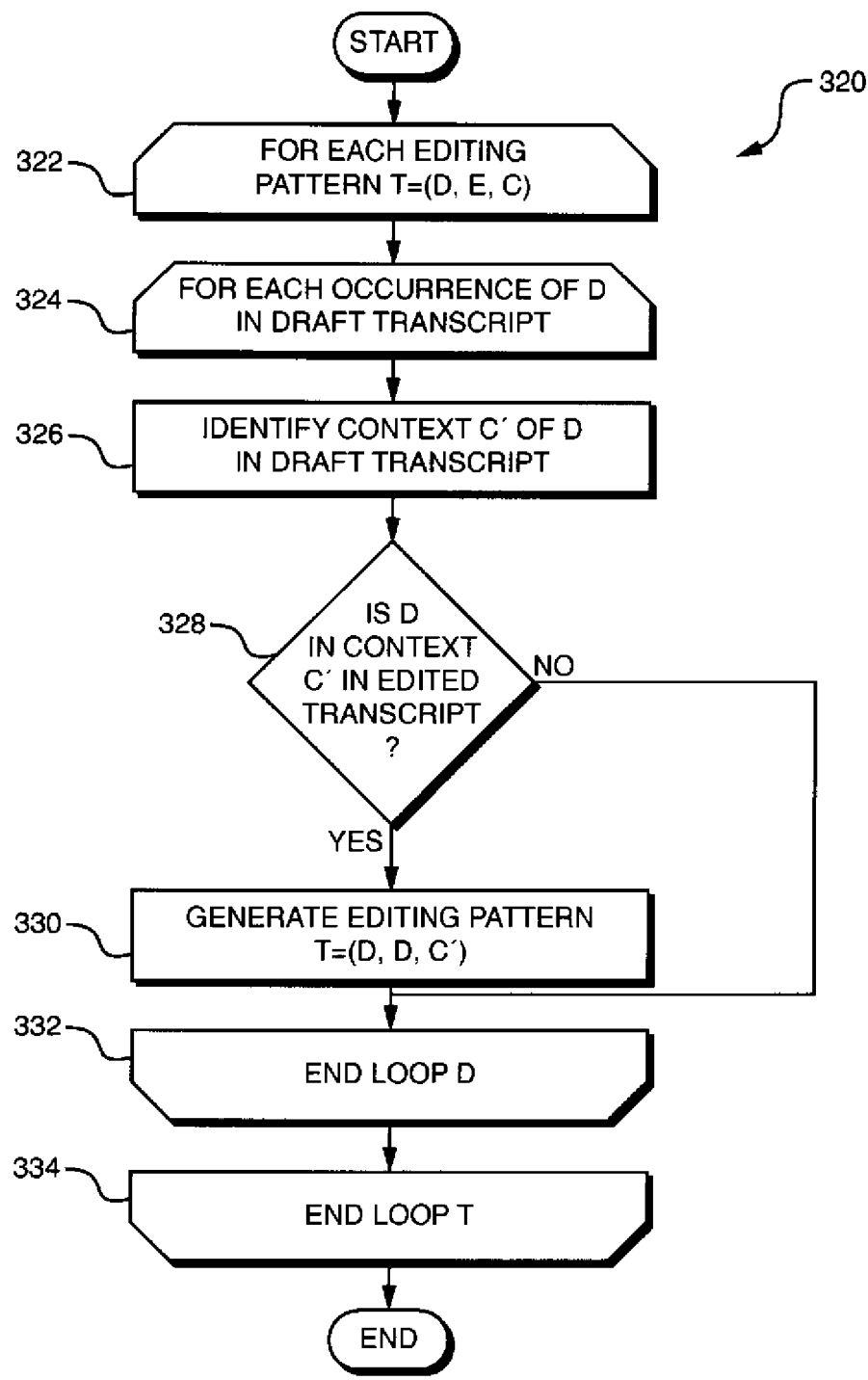

As shown in FIG. 9B, the effect of the classifier for content D is to partition the space 900 into three partitions 906a-c, each of which corresponds to a single correction rule. Each partition "contains" the editing patterns associated with the corresponding correction rule. In the current example, partition 906a "contains" editing pattern 902a (corresponding to the rule (D,D)); partition 906b "contains" editing patterns 902b and 902c (both corresponding to the rule (D,$E_1$)); and partition 906c "contains" editing patterns 902d and 902e (both corresponding to the rule (D,$E_2$)).

The purpose of step 510 is to identify decision criteria that define equivalence classes corresponding to the partitions 906a-c. When the same content D is subsequently observed in a new context C*, the decision criteria are applied to the context C to identify the partition in which context C belongs. Once this partition has been identified, the correction rule corresponding to the partition may be applied to the content D to produce edited content. Note that the correction rule corresponding to the selected partition may be the identity mapping (D,D), indicating that content D should not be changed in context C* and that the rule does not need to be applied.

The decision criteria for each partition may be developed in any of a variety of ways. For example, features common to the contexts in a partition may be identified, and those common features used as the decision criteria. For example, consider partition 906b. If the word "without" appears immediately to the left of content D in both contexts C' and C", then "having the word 'without' immediately to the left of content D" may be identified as a decision criteria for partition 906b. As another example, if "Aspirin" appears in context C' and "Prozac" appears in context C", then the fact that there is a medication name (generalizing from the two examples to any medication name) in the context may be part of the decision criteria for partition 906b.

These are merely simplified examples meant to illustrate how classifiers might identify equivalence classes. In practice, classifiers may use any combination of features of the observed contexts to generate decision criteria that define the equivalence classes. Step 510 may employ any techniques to generate decision criteria that generalize from the common features of the observed contexts so that such decision criteria may be applied not only to previously-observed contexts but also to previously-unobserved contexts.

Note that the training of the system 100 described above may be performed using more than one draft transcript 106 and corresponding edited transcript 110. In fact, the techniques described above may be usefully applied to a document corpus containing thousands or more documents. As the number of documents used to perform training increases, the quality of the correction rules 118 and the classifiers 122 will increase.

Once the error detection and correction system has been trained in the manner described above, the system may be used to detect and correct errors in other draft documents, such as draft transcripts of spoken audio streams, based on the contexts in which such errors occur. In general, therefore, various embodiments of the present invention may be characterized by the method 600 illustrated in FIG. 6. The method 600 enters a loop over each of a plurality of contents D in a first document for which it is desired that errors be corrected (step 602). The method 600 identifies a context C of the content D (step 604). The method 600 identifies a correction rule R, if any, that applies to content D in context C (step 606). The method 600 applies the correction rule R, if any, to the content D to produce corrected content (step 608). Note, however, that the correction rule R need not be applied if the correction rule represents the identity mapping. The method 600 repeats steps 604-608 for the remaining contents D in the first document (step 610). The result is a second document in which errors from the first document have been corrected.

Figure 6:
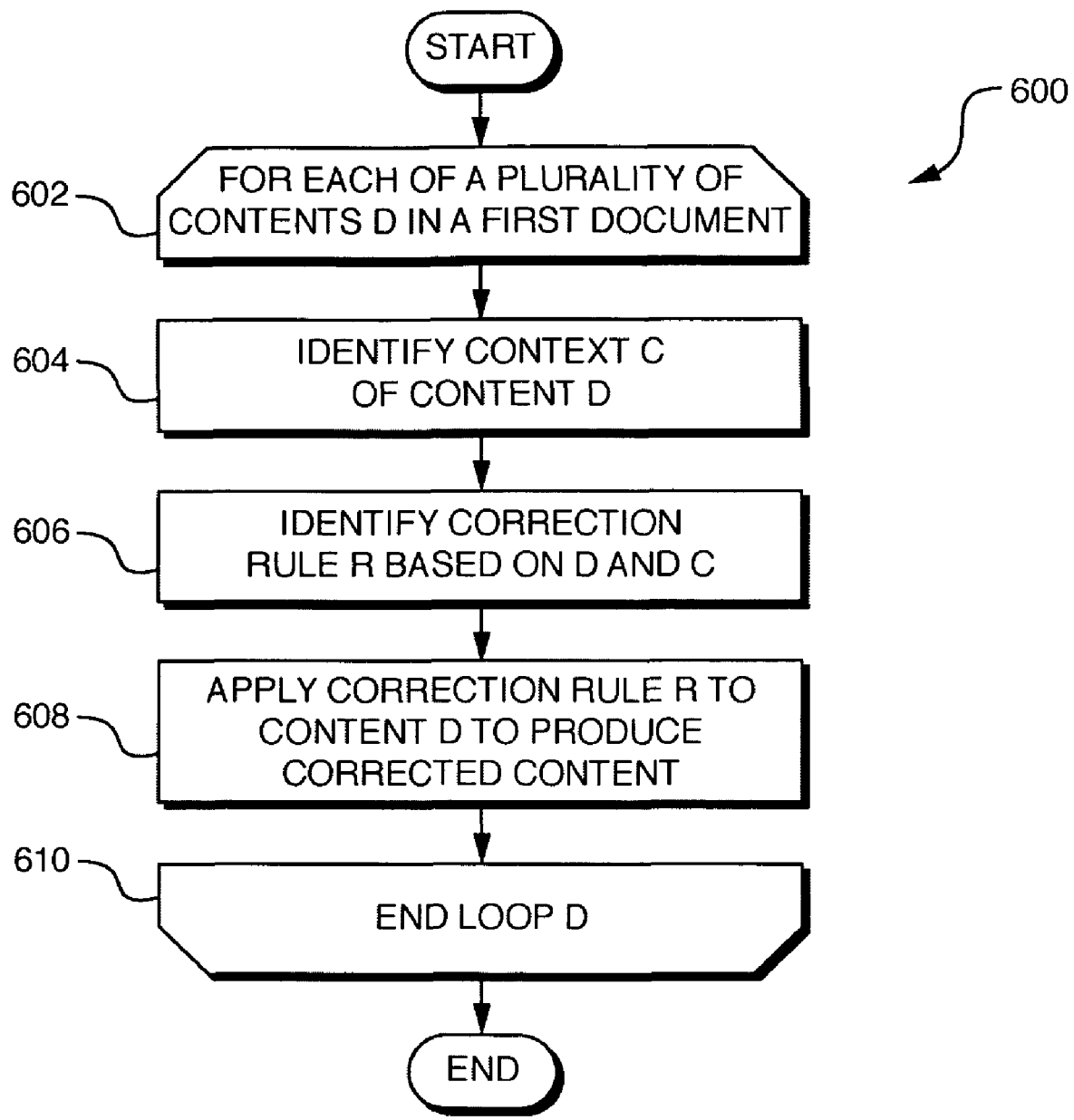
FIG. 6 is a flowchart of a high-level method performed by various embodiments of the present invention to correct errors by applying correction rules that are selected based on the contexts of the content to which they are applied.
Figure 7:
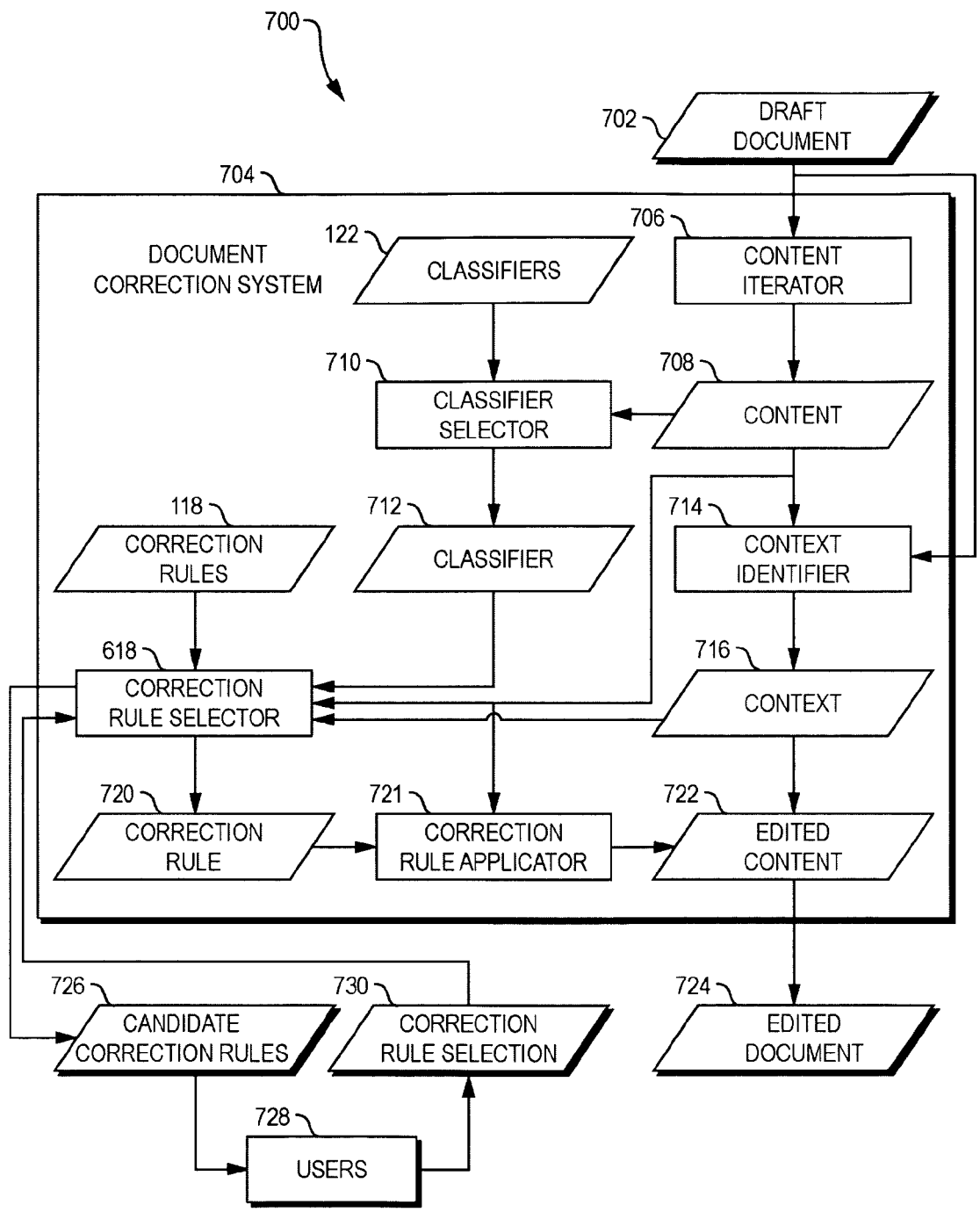
FIG. 7 is a dataflow diagram of a system for detecting and correcting errors using a document correction system that includes the correction rules and the classifiers of FIGS. 1A-1B.
Figure 8:
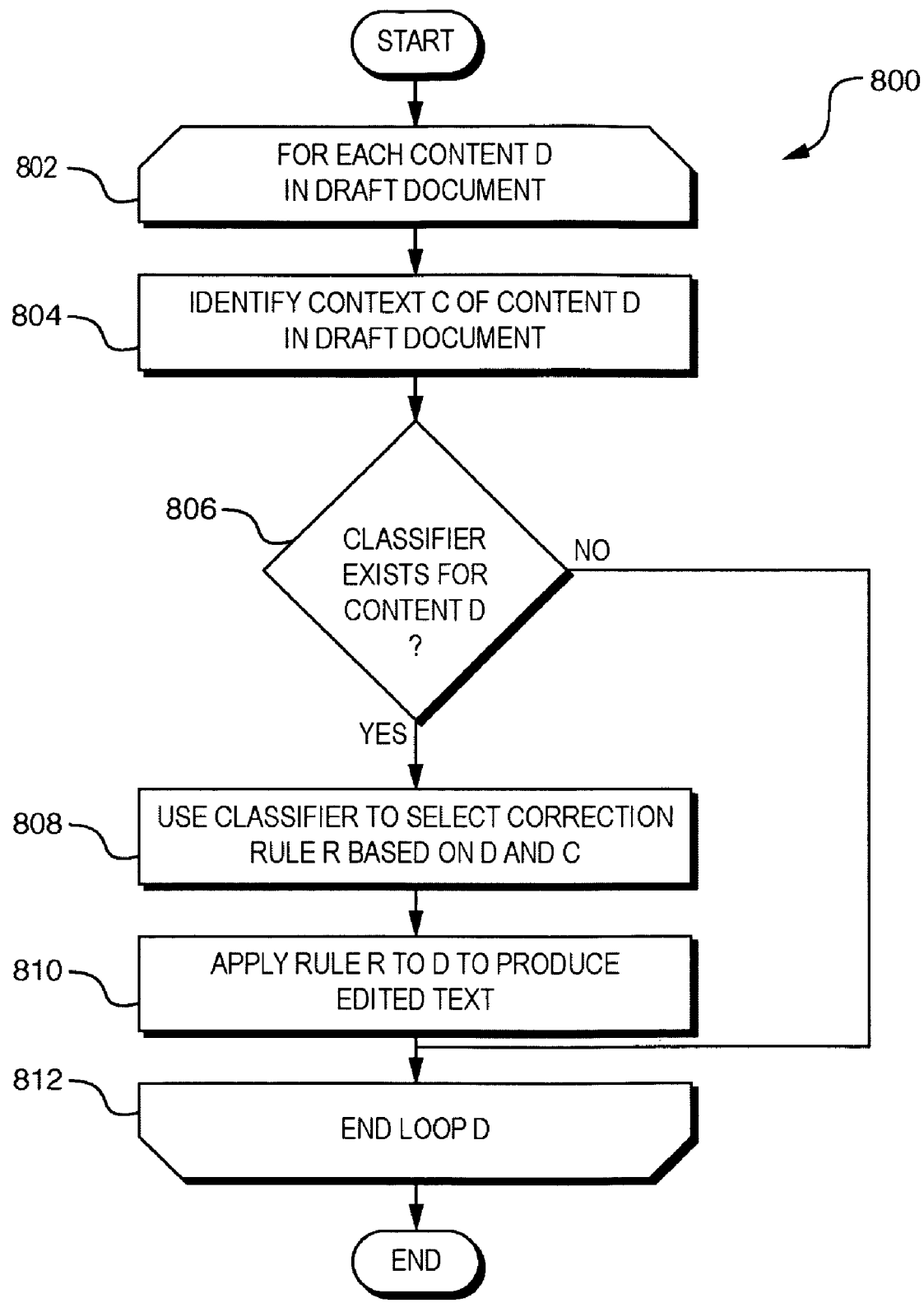
FIG. 8 is a flowchart of a method performed by the system of FIG. 7 to detect and correct errors in draft documents according to one embodiment of the present invention.

The method 600 illustrated in FIG. 6 assumes that a correction rule can be selected in step 606 based on the content D and the context C. Referring to FIG. 7, a flowchart is shown of a method 700 that uses classifiers to select a correction rule based on the current context. Referring to FIG. 8, a flowchart is shown of a method 800 that is performed by the system 700 in one embodiment of the present invention in which the classifiers may be used to select correction rules to apply to content based on the context of such content.

A content iterator 706 iterates over each unit of content D 708 in a draft document 702 (step 802). A context identifier 714 identifies the context C 716 of the content D 708 in the draft document 702 (step 804). A classifier selector 710 determines whether a classifier exists for content D 708 (step 806). If there is no such classifier, the content iterator 706 selects the next content 708 from the draft document 702.

If a classifier exists for content D, the classifier selector 710 selects the classifier 712, and a correction rule selector 718 applies the decision criteria for the classifier 712 to select a correction rule 720 (from among the correction rules 118) to apply to content D 708 based on the context C 716 (step 808). The correction rule selector 718 may, for example, make this selection by applying the decision criteria of each of the classifier's equivalence classes to the context 716 to produce a score for each correction rule (with higher scores representing better satisfaction of the corresponding decision criteria).

The correction rule selector 618 may select the correction rule that is a member of the equivalence class having the highest score.

The correction rule selector 718, therefore, effectively uses the classifier 712 to select the correction rule 720 by placing the context C 716 into the best matching equivalence class of observed contexts, thereby providing the ability to generalize to previously unseen contexts. In the case of medical reports, for example, if the context C is the text "without any signs," it may be useful to apply the same correction rule as has previously been applied in a similar context, such as "without fever." Because the correction rule selector 718 selects the correction rule 720 by identifying the equivalence class whose decision criteria provide the best score, rather than by applying rigid rules, the correction rule selector 718 may select an appropriate correction rule to apply even in previously-unseen contexts.

A correction rule applicator 721 applies the selected correction rule R 720 to the content D 708 to produce edited content E 722 (step 810) in an edited document 624. Note, however, that the correction rule R 720 need not be applied if the correction rule R 720 represents the identity mapping. The method 800 repeats steps 804-810 for the remaining units of content D 708 in the draft document 702. Upon the conclusion of the method 800, the edited document 724 reflects the editing operations performed on the draft document 702 as specified by the correction rules 118 and classifiers 122.

Note that the context identifier 714 may identify the context C for content D 708 at any level of granularity. For example, the context identifier 714 may be configured to identify the context for content D 708 as the words immediately preceding and following content D 708, as the sentence containing content D 708, as the author of content D 708, or as any other kind or combination of context at any level of granularity.

Although the correction rule selector 718 may select a correction rule even in the face of ambiguity about the context 716, the correction rule selector 718 may additionally or alternatively allow a user 728 of the system 704 to select the correction rule to apply. The correction rule selector 718 may use any criteria to decide whether to allow the user to select the correction rule 720. For example, the correction rule selector 618 may allow the user to provide a selection 730 of one correction rule from among competing correction rules 726 if none of the applicable decision criteria produce a sufficiently high score or if the highest-scoring correction rules have scores that are sufficiently close to each other.

The candidate correction rules 726 may be presented to the user 728 in an order corresponding to an estimate of their relative likelihood of correctness. The likelihood of correctness for each rule may also be presented to the user to assist the user in selecting a correction rule to apply. For example, if correction rule (D,E) has an estimated likelihood of correctness of $2/3$ and correction rule (D,E') has an estimated likelihood of correctness of $1/3$, the correction rules may be presented to the user as follows: (a) (D,E) ($2/3$); (b) (D,E') ($1/3$). Presenting the candidate correction rules to the user 728 in decreasing estimated likelihood of correctness may facilitate the process of selecting a valid correction rule to apply.

The system may keep track of the user's choices of correction rules in particular contexts to update its internal probabilistic model of the likelihood of correctness of competing editing patterns (e.g., by increasing the probabilities associated with correction rules selected by the user). In this way, the system may learn to imitate user choices after a certain period of usage, at which point manual selection by the user among alternatives may no longer be necessary.

Among the advantages of the invention are one or more of the following. Using contextual information to detect and correct errors increases the likelihood that such errors will be detected and corrected accurately. For example, a simple context-free rule that merely replaced all occurrences of the text "pattens" with "patterns" would fail to accurately correct the sentence "The company owns hundreds of pattens on medical equipment," in which "pattens" should be replaced with "patents," not "patterns." Knowledge about the context of the sentence, such as the fact that it occurs in an article about the law or is written by a lawyer, could be used to correct such errors more accurately than a context-free rule. Similarly, information about the document section in which a word occurs or the text preceding and following a word can be useful in selecting the correct editing operation to apply to the word.

Contextual information, therefore, may be used advantageously to select among competing editing operations that may be used to correct an error in a draft document. Assume, for example, that there are two editing rules that apply to content D: (D,E) and (D,E'), where E and E' differ. In the absence of contextual information, the choice of editing rule is ambiguous. The presence of contextual information, in the form of editing patterns such as (D,E,C) and (D,E',C'), enables a more informed choice of editing operation to be made. If, for example, content D occurs in context C in the current document, then editing operation (D,E) can be selected with confidence because of the matching contextual information contained in the editing pattern (D,E,C).

Furthermore, the present invention generalizes well to content in previously unseen contexts, selecting the 'best-matching' correction rule based on a classification of contexts into equivalence classes. For example, if the contexts "without any signs" and "without fever" are observed during training, the system may generalize from these contexts to develop an equivalence class Q having the word "without" as a decision criterion. Once the system has been trained, a newly-observed context such as "without symptoms" will be considered a good match to equivalence class Q. The correction rule associated with equivalence class Q may then be applied to the new context even though it was not observed during training.

Furthermore, the breadth and accuracy of the error detection and correction system disclosed herein may be improved by training it with more documents. As more and more pairs of draft and edited documents become available, editing patterns may be recomputed on larger and larger training sets, thereby increasing the robustness of the system while providing continuous adaptation to potentially changing editing behaviors. The ability of the system to correct errors may therefore improve over time. In particular, when competing correction rules are observed, the relative probabilities of the correction rules may be learned with higher degrees of accuracy by exposing the system to additional documents.

Furthermore, the system need not be pre-programmed with particular correction rules because the system learns correction rules by observation. Therefore, the system is not limited to using correction rules that are designed by a human programmer. Furthermore, the system may be calibrated to work with documents in different domains by training it on document corpora in those domains. In this way the system may be configured for use with documents in different domains without the need to reprogram the system.

All of these advantages lead to a reduction in the amount of time and cost required for proofreading and editing documents. The techniques disclosed herein may provide such reductions in cost and time either by eliminating the need for a human editor or by facilitating the job of such an editor. For example, as described above, the system may flag potential errors for the human editor and provide the editor with suggested corrections. Furthermore, the system may be used to correct certain errors automatically before the document is provided to the human editor, thereby decreasing the number of errors the human editor must identify and correct.

Detection and classification of editing patterns provides valuable information about what components of the draft generation process are causing errors and how these components can be updated to improve the quality of draft documents even before applying editing patterns. In the case where an automatic document generation system is used to generate the draft documents (such as the draft transcript 106), this feedback information can be used to improve components of the speech recognition and natural language processing systems that are used for document generation. For instance, frequent observation of editing patterns involving insertion of punctuation symbols may indicate that a punctuation prediction component of an automatic document generation system requires attention and optimization.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The invention is not limited to any of the described fields (such as medical and legal reports), but generally applies to any kind of structured documents. Furthermore, the various documents used by embodiments of the present invention (such as the draft transcript 106, the edited transcript 110, and the edited document 624) may be represented in any machine-readable form. Such forms include plain text documents and structured documents represented in markup languages such as XML. Such documents may be stored in any computer-readable medium and transmitted using any kind of communications channel and protocol.

The techniques disclosed herein may be used to perform actions other than error detection and correction. For example, the techniques disclosed herein may be applied to draft documents produced by automatic transcription systems. Such systems include an automatic speech recognizer that associates with each word a "confidence measure" indicating the likelihood that the word has been recognized correctly. When the techniques disclosed herein are applied to a draft document having such confidence measure annotations, the system may lower the confidence measure of any content that is identified as a likely error region (e.g., any content D that matches the content D in an editing pattern (D,E,C)). Such a lowered confidence measure may then trigger the content for review and correction.

Furthermore, different kinds (classes) of errors may be identified and treated differently. For example, deletions of content may be treated differently than modifications of content, which may in turn be treated differently than additions of content. Misspelling of a word may be treated differently than replacement of a word with a different word. Punctuation errors may be treated differently than spelling errors. Error classification may be performed at the time of editing pattern creation or at the time of error detection. When an error is detected, the class of the error may be used to select the corrective action to be taken and/or to suggest a course of action for preventing the error in the future. For example, the class of the error may be used to assist in improving the (human and/or automated) transcription system 104 that is used to produce draft documents (such as the draft transcript 106). The class of the error may also be used to define special correction rules that apply to particular classes of errors.

It was stated above that each classifier is associated with corresponding content D. The classifiers 122 may be associated with content at any level of granularity. For example, a classifier may be associated with a particular word (e.g., "John"), in which case the classifier would select the appropriate correction rule to apply to that word depending on the context in which it appears. A classifier may, however, be associated with content at any other level of granularity, such as a sentence, document section, or even an entire document. In each case the classifier selects the appropriate correction rule to apply to corresponding content based on the context in which it appears.

Although certain techniques are described herein as being applied in the context of automatic transcription systems, this is not a requirement of the present invention. For example, FIG. 1A shows the use of a draft transcript 106 and corresponding edited transcript 110 to train the system 100. The system 100 may, however, be trained with draft documents (and corresponding edited documents) that were not generated using (manual or automated) transcription. For example, the system 100 may be trained using documents that were written manually or that were generated from other documents using optical character recognition (OCR). Similarly, the draft document 702 that is corrected by the correction system 704 need not be a draft transcript, but rather may be any kind of document for which error detection and correction is desired.

Although the rules 118 are referred to herein as "correction" rules, such rules are not limited to correcting transcription errors, but rather may be used more generally to perform any kind of editing operation. For example, a correction rule may be used to edit text to comply with a formatting requirement. Therefore, the correction rules 118 more generally represent editing rules.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by a computer processor executing computer program instructions tangibly stored on a non-transitory computer readable medium, the method comprising:
   (A) identifying a plurality of editing patterns of the form T=(D,E,C), wherein each of the plurality of editing patterns relates content D in an original document corpus to corresponding content E in an edited document corpus in a context C shared by contents D and E; and
   (B) identifying a plurality of likelihoods of correctness of the plurality of editing patterns, wherein (B) comprises:
      (B)(1) counting a number of positive instances in which content D in context C in the original document corpus has been replaced with content E in context C in the edited document corpus, and identifying a likelihood of correctness of the editing pattern T=(D,E,C) based on the number of positive instances; and
      (B)(2) counting a number of negative instances in which content D in context C in the original document corpus remained unchanged in context C in the edited document corpus, and identifying a likelihood of correctness of the editing pattern T=(D,E,C) based on the number of positive instances and the number of negative instances;
   (C) selecting one of the plurality of editing patterns based on the plurality of likelihoods of correctness; and
   (D) applying the selected editing pattern to replace an instance of content D in a further document with an instance of content E in the further document.

2. The method of claim 1, wherein (B) comprises counting the number of instances by comparing documents in the original document corpus to documents in the edited document corpus to identify differences between them.

3. The method of claim 1, wherein (B) comprises identifying editing actions performed on the original document corpus to replace content D in context C in the original document corpus to produce content E in context C in the edited document corpus.

4. The method of claim 1, wherein (C) comprises selecting the maximum likelihood of correctness among the plurality of likelihoods of correctness.

5. A non-transitory computer readable medium comprising computer program instructions executable by a computer processor to perform a method, the method comprising:
   (A) identifying a plurality of editing patterns of the form T=(D,E,C), wherein each of the plurality of editing patterns relates content D in an original document corpus to corresponding content E in an edited document corpus in a context C shared by contents D and E; and
   (B) identifying a plurality of likelihoods of correctness of the plurality of editing patterns, wherein (B) comprises:
      (B)(1) counting a number of positive instances in which content D in context C in the original document corpus has been replaced with content E in context C in the edited document corpus, and identifying a likelihood of correctness of the editing pattern T=(D,E,C) based on the number of positive instances; and
      (B)(2) counting a number of negative instances in which content D in context C in the original document corpus remained unchanged in context C in the edited document corpus, and identifying a likelihood of correctness of the editing pattern T=(D,E,C) based on the number of positive instances and the number of negative instances;
   (C) selecting one of the plurality of editing patterns based on the plurality of likelihoods of correctness; and
   (D) applying the selected editing pattern to replace an instance of content D in a further document with an instance of content E in the further document.

6. The computer readable medium of claim 5, wherein (B) comprises counting the number of instances by comparing documents in the original document corpus to documents in the edited document corpus to identify differences between them.

7. The computer readable medium of claim 5, wherein (B) comprises identifying editing actions performed on the original document corpus to replace content D in context C in the original document corpus to produce content E in context C in the edited document corpus.

8. The computer readable medium of claim 5, wherein (C) comprises selecting the maximum likelihood of correctness among the plurality of likelihoods of correctness.

9. A method performed by a computer processor executing computer program instructions tangibly stored on a non-transitory computer readable medium, the method comprising:
   (A) identifying a plurality of editing patterns of the form T=(D,E,C), wherein each of the plurality of editing patterns relates content D in an original document corpus to corresponding content E in an edited document corpus in a context C shared by contents D and E; and
   (B) identifying a plurality of likelihoods of correctness of the plurality of editing patterns;
   (C) receiving an input from a user representing a selection of one of the plurality of editing patterns;
   (D) applying the selected editing pattern to replace an instance of content D in a further document with an instance of content E in the further document; and
   (E) increasing the likelihood of correctness of the selected editing pattern in response to the selection;
   wherein the plurality of likelihoods of correctness includes an initial likelihood of correctness of the selected editing pattern;
   wherein the selected editing pattern comprises a positive editing pattern;
   wherein the initial likelihood of correctness of the selected editing pattern is based on a number of occurrences of the positive editing pattern; and
   wherein (E) comprises incrementing the number of occurrences of the positive editing pattern and increasing the likelihood of correctness of the selected editing pattern based on the incremented number of occurrences of the positive editing pattern.

10. The method of claim 9:
   wherein the initial likelihood of correctness of the selected editing pattern is based on a number of occurrences of the positive editing pattern and a number of occurrences of a negative editing pattern corresponding to the positive editing pattern.

11. The method of claim 9, wherein (C) further comprises determining that none of the plurality of editing patterns satisfies predetermined decision criteria, and prompting the user for the input representing the selection of one of the plurality of editing patterns in response to the determination.

12. The method of claim 9, wherein (C) further comprises prompting the user with output representing at least some of the plurality of editing patterns presented in a descending order corresponding to the likelihoods of correctness of the at least some of the plurality of editing patterns.

13. A non-transitory computer readable medium comprising computer program instructions executable by a computer processor to perform a method, the method comprising:
   (A) identifying a plurality of editing patterns of the form T=(D,E,C), wherein each of the plurality of editing patterns relates content D in an original document corpus to corresponding content E in an edited document corpus in a context C shared by contents D and E; and
   (B) identifying a plurality of likelihoods of correctness of the plurality of editing patterns;
   (C) receiving an input from a user representing a selection of one of the plurality of editing patterns;
   (D) applying the selected editing pattern to replace an instance of content D in a further document with an instance of content E in the further document; and
   (E) increasing the likelihood of correctness of the selected editing pattern in response to the selection;
      wherein the plurality of likelihoods of correctness includes an initial likelihood of correctness of the selected editing pattern;
      wherein the selected editing pattern comprises a positive editing pattern;
      wherein the initial likelihood of correctness of the selected editing pattern is based on a number of occurrences of the positive editing pattern; and
   wherein (E) comprises incrementing the number of occurrences of the positive editing pattern and increasing the likelihood of correctness of the selected editing pattern based on the incremented number of occurrences of the positive editing pattern.

14. The computer readable medium of claim 13:
   wherein the initial likelihood of correctness of the selected editing pattern is based on a number of occurrences of the positive editing pattern and a number of occurrences of a negative editing pattern corresponding to the positive editing pattern.

15. The computer readable medium of claim 13, wherein (C) further comprises determining that none of the plurality of editing patterns satisfies predetermined decision criteria, and prompting the user for the input representing the selection of one of the plurality of editing patterns in response to the determination.

16. The computer readable medium of claim 13, wherein (C) further comprises prompting the user with output representing at least some of the plurality of editing patterns presented in a descending order corresponding to the likelihoods of correctness of the at least some of the plurality of editing patterns.

* * * * *

UNITED STATES PATENT AND TRADEMARK OFFICE
CERTIFICATE OF CORRECTION

PATENT NO. : 8,086,453 B2
APPLICATION NO. : 12/360109
DATED : December 27, 2011
INVENTOR(S) : Koll Detlef et al.

Page 1 of 2

It is certified that error appears in the above-identified patent and that said Letters Patent is hereby corrected as shown below:

On the Title page, in Item (56), under (Other Publications), line 9, delete "Copora," and insert -- Corpora, --, therefor.

On the Title page, Item (57), in Abstract, line 8, delete "class)." and insert -- class. --, therefor.

In FIG. 3B, replace "T=(D, E, C')" in element 330 with "T=(D, D, C')", as indicated on the attached replacement sheet.

In column 9, line 51, delete "C" and insert -- C* --, therefor.

In column 9, line 51, delete "C" and insert -- C* --, therefor.

Signed and Sealed this
Third Day of April, 2012

David J. Kappos
*Director of the United States Patent and Trademark Office*